United States Patent Office 3,353,691
Patented Nov. 21, 1967

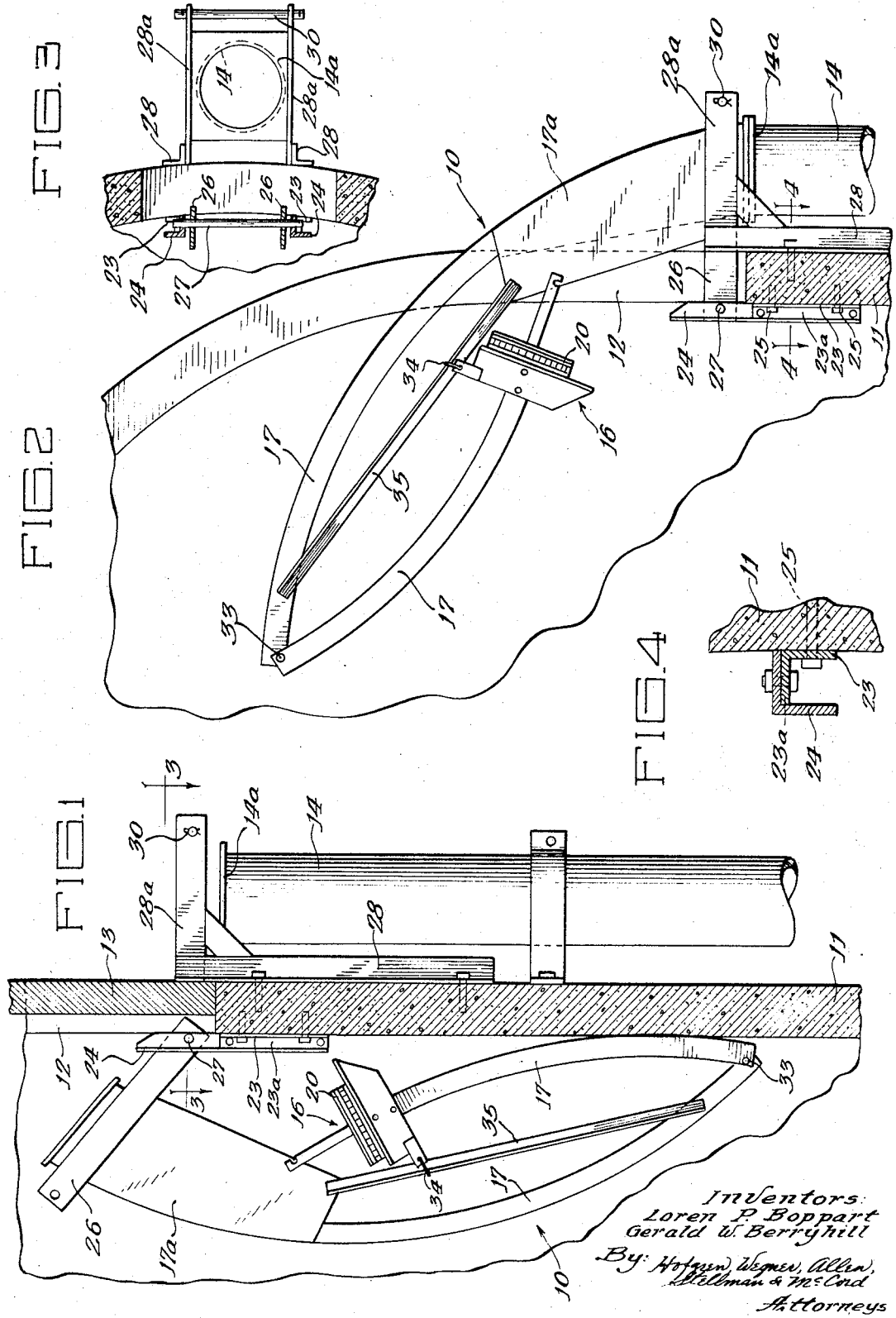

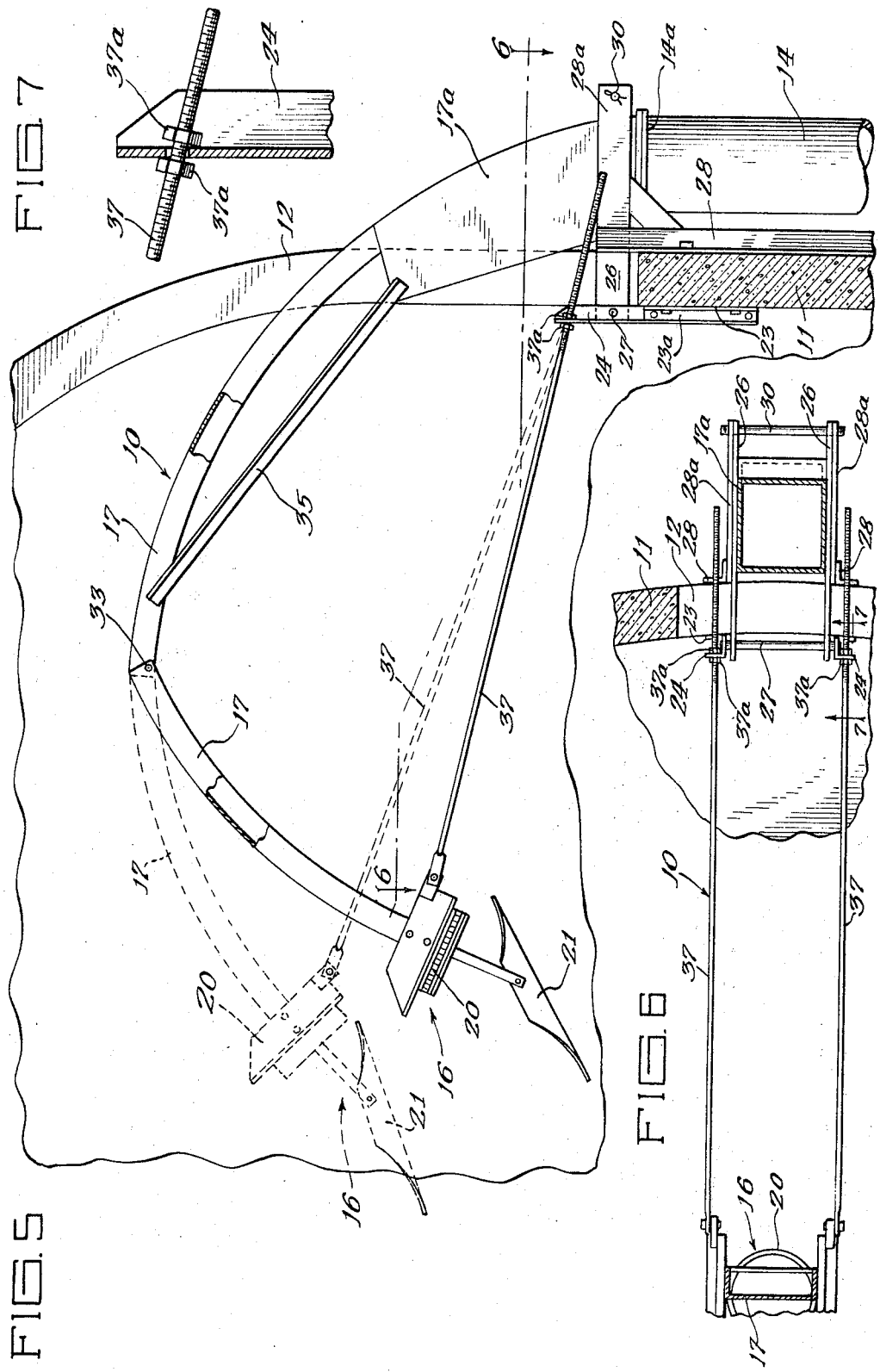

3,353,691
SILAGE DISTRIBUTOR
Loren P. Boppart and Gerald W. Berryhill, Harvard, Ill., assignors to Starline, Inc., a corporation of Illinois
Filed July 5, 1966, Ser. No. 562,741
8 Claims. (Cl. 214—17)

This invention relates to a silage distributor for use in filling silos, and more particularly to a distributor that is permanently mounted on the interior of a silo and adapted for ready movement through a silo opening to receive silage from the discharge end of an elevator filler pipe.

The primary object of this invention is to provide a new and improved silage distributor.

When a silo is being filled, silage is blow up through a filter pipe mounted on the outside of the silo wall. A distributing means, normally in the form of a chute, is either mounted on the discharge end of the filler pipe or on the silo itself. The chute extends away from the discharge end of the filler tube through an opening in the silo and has a distributor head for distributing silage within the interior of the silo. The problem with the silage distributors presently available is that when the silo has been filled it is necessary to close the silo roof, and for this to be done it is necessary to remove the entire distributing structure from the silo. The device of the present invention, on the other hand, is pivotally mounted on the interior of the silo so that the distributing means may be pivoted to a storage position disposed entirely within the silo so the roof opening may be closed.

An object of this invention, therefore, is to provide a silage distributor which does not have to be removed after the silo has been filled, and has a storage position entirely within the silo.

Another object is to provide a silage distributor of the character described which comprises a silage distributing chute that folds upon itself to take up less height when disposed in its storage position inside the silo.

Still a further object of this invention is to provide a silage distributor of the character described including a novel means for varying the distance of the distributor from the silo wall to readily adapt the distributor for different size silos.

Other objects and advantages of the invention will become readily apparent from the following detailed description taken in connection with the accompanying drawings in which:

FIG. 1 is a partial sectional view through a silo wall with the silo opening closed and illustrating the silage distributor of this invention folded within the silo in its storage position;

FIG. 2 is a view similar to that of FIG. 1 illustrating the silage distributor pivoted through the silo opening with its silage receiving end positioned on top of the discharge end of an elevator filler pipe;

FIG. 3 is a fragmentary horizontal sectional view taken generally along the line 3—3 of FIG. 1;

FIG. 4 is a fragmentary horizontal sectional view taken generally along the line 4—4 of FIG. 2;

FIG. 5 is a view similar to that of FIG. 1 showing the silage distributor in its extended operative position, and illustrating in phantom the adjustable feature of the distributor;

FIG. 6 is a fragmentary horizontal sectional view taken generally along the line 6—6 of FIG. 5; and FIG. 7 is a fragmentary vertical sectional view on an enlarged scale through the mounting bracket for the distributor taken generally along the line 7—7 of FIG. 6.

Referring to FIGS. 1, 2 and 5, a silage distributor, generally designated 10, is shown in FIG. 1 to be pivotally mounted entirely within a silo 11 in a storage position immediately below an opening 12 which is shown in FIG. 1 closed by a door 13. The distributor is adapted to be swung upwardly from its storage position to a fully operative position as shown in FIG. 5 wherein the distributor receives silage from the discharge end 14a of a filler pipe 14 which is mounted on the exterior of the silo with a discharge end 14a located adjacent the opening 12 in the silo. The filler pipe 14 is part of a common pneumatic blower type silo filling system. As seen in FIG. 5, and as will be hereinafter described, the distributor is adjustable to vary the distance of the distributor head, generally designated 16, from the interior silo walls in order to adapt the device of this invention for different size silos.

Referring to FIG. 5, the distributor is comprised of an arcuate open bottom channel member 17 forming a silage guide or chute for directing the blown silage from the discharge end 14a of the filler pipe through the arcuate chute 17 to the distributor head 16 mounted on the free end of the chute. The velocity of the stream of silage is high enough that most of it remains in the open bottom channel 17. The chute 17 has a silage receiving end 17a which fits over the discharge end 14a of the filler pipe and includes an enlarged rectangular tube to direct the silage into the open bottom chute 17. The distributor head 16 on the free end of the chute is a well known device and includes a motor driven rotatable drive ring 20 and a depending distributor pan 21. The stream of silage is blown from the free end of chute 17 to the distributor pan 21 which deflects the silage outwardly therefrom in the direction of the silo walls. The motor driven drive ring 20 rotates the distributor pan 21 to evenly distribute the silage about the interior of the silo.

The distributor chute is pivotally mounted on the inside of the silo immediately below the silo opening 12 by angle brackets 23 and 24. As seen in FIG. 4, one angle bracket 23 is secured to the silo wall by bolts 25 (FIG. 2) and an inner angle bracket 24 is bolted to the inwardly extending leg 23a of angle bracket 23. As seen in FIG. 6, a set of these angle brackets is mounted on the silo wall on each side of the chute and pivotally supports the chute thereon. The chute has arms 26 (FIG. 1) on each side of the silage receiving portion 17a and has a pivot pin 27 extending therebetween and impaling openings in the angle brackets 24 to pivotally mount the distributor chute. Thus, it can be seen from FIGS. 1, 2 and 5 that the chute hangs by gravity entirely within the silo when in its storage position (FIG. 1) and may be pivotally raised about pivot pin 27 to an intermediate position (FIG. 2, hereinafter described) and then to its fully operative position (FIG. 5) wherein the silage receiving portion 17a of the chute 17 is disposed above the silage discharge end 14a of filler pipe 14.

A mounting bracket 28 for the filler pipe 14 on the exterior of the silo includes outwardly extending arms 28a (FIG. 1) embracing the arms 26 of the distributor chute when the latter is in its operative position (FIG. 5). The arms 28a of the filler tube mounting bracket 28 and the arms 26 of the distributor chute have aligned openings through which an outside fastening pin 30 (FIG. 6) may be inserted to hold the chute in its operative position. The openings in the arms 26 of the distributor chute may also be employed to raise the chute from its storage position by securing a rope through the openings in the arms and pulling the chute about the pivot pin 27 to its operative position from the exterior of the silo.

The distributor chute 17 consists of two sections which may be folded about a pivot point 33 approximately in the middle of the chute so that the distributor takes up less height within the silo when in its storage position. A fastening hook 34 may be secured to the distributor head and hooked around a supporting brace 35 to hold the chute in its folded position. Not only does this folding feature reduce the height of the distributor when in its storage position, but as seen in FIG. 5, it facilitates adjusting the distance of the distributor head 16 from the interior walls of the silo to adopt the distributor for silos of different sizes.

A pair of push rods 37 (FIG. 5) are pivotally secured to the distributor head 16 and extend through openings in the mounting angle brackets 24, so that after the chute is raised to its intermediate position (FIG. 2), the rods may be secured to the distributor head and used to push the chute to its operative position. Each rod 37 has adjusting nuts 37a on each side of the angle bracket 24 for adjusting the length of the push rod to vary the distance of the distributor head 16 from the interior walls of the silo. This adjustment feature not only permits the distance of the distributor head from the silo walls to be varied but it also permits the height of the distributor head to be varied.

In the operation, the silage distributor of this invention is normally disposed in a storage position entirely within the interior of the silo as shown in FIG. 1, and is completely clear of the silo opening 12 so that the door 13 may be closed without obstruction. When the silo is to be filled, the door is opened and a rope is secured to the arms 26 of the distributor chute by insertion into the openings which receive the outside fastening bolt 30 and the distributor is pulled and pivoted about pin 27 to the position shown in FIG. 2, when the outside fastening bolt 30 is inserted through the aligned openings in the arms 26 of the chute and the arms 28a of the filler pipe mounting bracket 28. The hook 34 on the distributor head is unhooked from the chute's supporting brace 35. The push rods 37 are then pivotally attached at one end to the distributor head 16 and pushed to unfold the distributor chute. The free end of each rod is inserted into an opening in the mounting bracket 24 and is adjusted by adjusting nuts 37a to position the distributor head at a desired distance away from the interior walls of the silo. When the silo has been filled, this sequence of steps is reversed and the entire distributor is pivoted about pin 27, so that the folded assembly hangs down inside the silo wall out of the way of closing the silo opening 12.

As best seen in FIG. 1, the folded distributor hangs entirely below the pivot pin 27, and this makes it very easy to mount the unit in a silo initially. A temporary A-frame carrying a pulley is mounted on the angle brackets 23 inside the silo wall, and a rope or cable is run over the pulley with one end on the floor of the silo where it may be conveniently connected to the chute arms 26 adjacent the holes for the pin 27. The unit may then be hoisted into position where it will naturally hang almost as seen in FIG. 1, so it is easy to guide the arms between the brackets 23 and insert the pin 27.

The drawings illustrate the distributor mounted immediately below the regular filler opening in the roof of a silo. The opening is opened or closed by a pie-shaped roof segment. When the distributor is mounted in such a fashion, the level of the silage is a few feet below the top wall of the silo. Of course, the distributor may be permanently installed in the roof with an appropriate opening therefor away from the regular filler opening as is done with many distributors presently available.

The foregoing detailed description is given for clearness of understanding only and no unnecessary limitations are to be understood therefrom, as some modifications will be obvious to those skilled in the art.

We claim:

1. A silage distributor adapted to receive silage from the discharge end of an elevator filler pipe which is mounted on the exterior of a silo with its discharge end located adjacent an opening in the silo, comprising: a silage distributing means which has a silage receiving end adapted to receive silage from the discharge end of said filler pipe and a discharge end adapted to discharge silage into the silo; and means mounting said distributing means on the inside of the silo for pivotal movement between a storage position disposed entirely within the silo clear of the opening, and an operative position with its receiving end extending through said opening for receiving silage from said filler pipe.

2. The silage distributor of claim 1 wherein said distributing means includes a distributing chute having a distributor head at one end spaced from the interior walls of the silo and a silage receiving portion at its other end, brackets on said receiving portion which span the silo wall in the operative position of the chute, and a pivot pin which connects said brackets to the mounting means.

3. The silage distributor of claim 2 wherein said mounting means is on the interior of the silo wall immediately below the silo opening, the chute hangs by gravity within the silo when in its storage position, and means are provided for pulling the chute from outside the silo to pivot it to its operative position with its receiving end surmounting the discharge end of the filler pipe.

4. The silage distributor of claim 1 wherein the distributing means includes a first receiving section, a second discharge section, and means pivotally connecting said sections so the distributing means may be folded to reduce the height of the chute when in its storage position.

5. The silage distributor of claim 4 which includes a rigid push rod pivotally fixed to and extending from the discharge end of the distributing means to push the latter to its operative position, said push rod being longitudinally slidable in the distributor mounting means to vary the position of the discharge end by pivoting the discharge section about the pivotal connection when the chute is in its operative position.

6. A silage distributor adapted to receive silage from the discharge end of an elevator filler pipe mounted on the exterior of the silo with its discharge end located adjacent an opening in the silo, comprising: a silage distributor chute having a distributor head at one end and a silage receiving portion at its other end; a mounting bracket secured to the interior of the silo wall immediately below the silo opening; and means pivotally mounting said distributor chute on said mounting bracket for movement between a storage position in which it hangs by gravity entirely within the silo clear of the opening therein, and an operative position with its receiving end extending through the opening surmounting the discharge end of said filler pipe.

7. The silage distributor of claim 6 wherein the distributing means includes a first receiving section, a second discharge section, and means pivotally connecting said sections so the distributing means may be folded.

8. The silage distributor of claim 7 which includes a rigid push rod pivotally fixed to and extending from the discharge end of the distributing means to push the latter to its operative position, said push rod being longitudinally slidable in said mounting bracket to vary the position of the discharge end by pivoting the two sections about the pivotal connection when the chute is in its operative position.

References Cited

UNITED STATES PATENTS 2,650,136   8/1953   Raleigh _____ 302—60
3,206,044   9/1965   Schwichtenberg _____ 214—17

HUGO O. SCHULZ, *Primary Examiner.*

ROBERT G. SHERIDAN, *Examiner.*